United States Patent
Anglart et al.

(10) Patent No.: US 9,510,553 B2
(45) Date of Patent: Dec. 6, 2016

(54) ARRANGEMENT AND METHOD FOR A MILKING SYSTEM

(71) Applicant: DELAVAL HOLDING AB, Tumba (SE)

(72) Inventors: Dorota Anglart, Grodinge (SE); Mikael Kallman, Bromma (SE); Sten Mellberg, Gustavsberg (SE)

(73) Assignee: DELAVAL HOLDING AB, Tumba (SE)

( * ) Notice: Subject to any disclaimer, the term of this patent is extended or adjusted under 35 U.S.C. 154(b) by 71 days.

(21) Appl. No.: 14/402,711

(22) PCT Filed: Mar. 15, 2013

(86) PCT No.: PCT/SE2013/050262
§ 371 (c)(1),
(2) Date: Nov. 21, 2014

(87) PCT Pub. No.: WO2013/187821
PCT Pub. Date: Dec. 19, 2013

(65) Prior Publication Data
US 2015/0107518 A1    Apr. 23, 2015

Related U.S. Application Data

(60) Provisional application No. 61/658,530, filed on Jun. 12, 2012.

(30) Foreign Application Priority Data

Jun. 12, 2012 (SE) .................................. 1250608

(51) Int. Cl.
*A01J 3/00* (2006.01)
*A01J 5/00* (2006.01)
(Continued)

(52) U.S. Cl.
CPC ............... *A01J 5/0175* (2013.01); *A01J 5/003* (2013.01); *A01J 5/007* (2013.01); *A01J 7/00* (2013.01); *A01K 29/005* (2013.01); *G06T 7/0004* (2013.01)

(58) Field of Classification Search
CPC ........... A01J 5/0175; A01J 5/003; A01J 7/00; A01J 5/007; A01J 5/017; A01J 5/00; A01J 5/17; A01K 29/005; G06T 7/0004; G06T 1/00; G06T 7/00; B25J 19/02
(Continued)

(56) References Cited

U.S. PATENT DOCUMENTS

| 7,246,571 B2 * | 7/2007 | Van Den Berg | A01J 7/04 119/14.02 |
| 7,490,576 B2 * | 2/2009 | Metcalfe | A01J 5/0175 119/14.08 |

(Continued)

FOREIGN PATENT DOCUMENTS

| GB | 2 325 300 A | 11/1998 |
| RU | 2008 140 696 A | 4/2010 |

(Continued)

OTHER PUBLICATIONS

International-Type Search Report, dated Dec. 7, 2012, from corresponding PCT application.
(Continued)

*Primary Examiner* — Jennifer E Novosad
(74) *Attorney, Agent, or Firm* — Young & Thompson

(57) ABSTRACT

A combined teat position and breeding rating determining arrangement for a milking system having a milking stall, a movable robot arm for automatically attaching teat cups to the teats of the milking animal, and a control device for controlling the movement of the robot arm based on deter-
(Continued)

mined positions of the teats of the milking animal. The arrangement includes a three-dimensional camera directed towards the udder of the milking animal that repeatedly records three-dimensional images of the udder, and a processing unit that repeatedly detects the udder or teats of the milking animal, determines their positions based on the recorded three-dimensional images, automatically determines the shapes of the udder or teats based on the repeatedly recorded three-dimensional images, and automatically calculates a breeding rating based on the determined shapes of the udder or teats of the milking animal.

19 Claims, 3 Drawing Sheets

(51) Int. Cl.
| | |
|---|---|
| *A01J 5/017* | (2006.01) |
| *A01J 5/007* | (2006.01) |
| *A01J 5/003* | (2006.01) |
| *A01J 7/00* | (2006.01) |
| *A01K 29/00* | (2006.01) |
| *G06T 7/00* | (2006.01) |

(58) Field of Classification Search
USPC ............ 119/14.01–14.04, 14.08, 14.11, 14.14, 119/14.46, 14.45, 14.47, 14.18; 340/573.3, 340/573.1, 540
See application file for complete search history.

(56) References Cited

U.S. PATENT DOCUMENTS

| | | | | |
|---|---|---|---|---|
| 8,210,122 | B2* | 7/2012 | Pettersson | A01J 5/0175 119/14.08 |
| 8,624,744 | B2* | 1/2014 | Holmgren | A01J 5/0175 119/14.02 |
| 8,794,181 | B2* | 8/2014 | Bareket | A01J 5/0175 119/14.02 |
| 8,885,891 | B2* | 11/2014 | Hofman | A01J 5/007 119/14.01 |
| 2002/0152963 | A1* | 10/2002 | Vijverberg | A01J 5/0175 119/14.08 |
| 2003/0145795 | A1* | 8/2003 | Nilsson | A01J 5/0175 119/14.02 |
| 2004/0065264 | A1* | 4/2004 | Ealy | A01J 5/0175 119/14.08 |
| 2010/0288198 | A1* | 11/2010 | Liao | A01J 5/0175 119/14.02 |
| 2010/0289649 | A1* | 11/2010 | Holmgren | A01J 5/0175 340/573.3 |
| 2010/0295940 | A1 | 11/2010 | Schwarte | |
| 2011/0245975 | A1* | 10/2011 | Daubner | A01J 5/0175 700/259 |
| 2012/0272912 | A1* | 11/2012 | Hofman | A01K 1/12 119/14.03 |
| 2012/0272913 | A1* | 11/2012 | Hofman | A01J 5/00 119/14.03 |
| 2015/0107518 | A1* | 4/2015 | Anglart | A01J 5/007 119/14.02 |
| 2015/0342139 | A1* | 12/2015 | Saville | G01B 11/2545 119/14.08 |

FOREIGN PATENT DOCUMENTS

| | | |
|---|---|---|
| RU | 2423825 C1 | 7/2011 |
| WO | 98/45808 A1 | 10/1998 |
| WO | 02/07098 A1 | 1/2002 |
| WO | 2009/049887 A1 | 4/2009 |
| WO | 2010/023122 A2 | 3/2010 |
| WO | 2010/060693 A1 | 6/2010 |

OTHER PUBLICATIONS

International Search Report, dated Jul. 3, 2013, from corresponding PCT application.
Supplementary International Search Report, dated Sep. 5, 2014, from corresponding PCT application.
Boulle, Breeding and selection of dairy cows, Bull Breeding services, 2005, Retrieved from the Internet: <url: http://agriculture.kzntl.gov.za/portal/AgricPublications/ProductionGuidelines/DairyinginKwaZuluNatal/BreedingandSelectionofDairyCows/tabid/240/Default.aspx>.
Anonymously, "Automatisk spenlokalisering", Research Disclosure, Sep. 1, 2009, p. 963, vol. 545, No. 17.
Byskov et al., "Possibilites of Implementing Measures from Automatic Milking Systems in Routine Evaluations of Udder Conformation and Milking Speed", Interbull Bulletin No. 46, May 28, 2012, pp. 28-32, Retrieved from the Internet: <url: https://www.landbrugsinfo.dk/Kvaeg/Avl/Sider/20120529_Artikel0mRobotdataTilInterbull_KVB.pdf?List={054f3326-7be6-421d-9e9a-d95e2403ae0c}&download=true.
Berry et al., "Genetic relationships among linear type traits, milk yield, body weight, fertility and somatic cell coutn in primiparous dairy cows", Irish Journal of Agricultural and Food Research 43, Jan. 1, 2004, pp. 161-176, Retrieved from the Internet: <url: http://www.teagasc.ie/research/journal/archives/vol43no2/0201.pdf.
Byskov et al., "Possibilites of Implementing Measures from Automatic Milking Systems in Routine Evaluations of Udder Conformation and Milking Speed", Interbull Meeting May 28-31, 2012, pp. 1-19, Retrieved from the Internet: <url: https://www.landbrugsinfo.dk/Kvaeg/Avl/Sider/ITB_Cork2012_KVB_pp.pdf?List={054f3326-7be6-421d-9e9a-d95e2403ae0c}&download=true.
Kostomakhin N.M. Skotovodstvo, Sankt-Peterburg, Moskva, Krasnodar, 2009, pp. 43-45.

\* cited by examiner

ARRANGEMENT AND METHOD FOR A MILKING SYSTEM

TECHNICAL FIELD OF THE INVENTION

The present invention generally relates to dairy farm robot milking.

DESCRIPTION OF RELATED ART AND BACKGROUND OF THE INVENTION

Robot milking and automatic milking systems (AMS) have become increasingly popular during recent years due to its capabilities of eliminating labor; offering milking consistency, increased milking frequency, and herd management; and providing lower stress environment for the milking animals. The approach comprises at least one robot arm, which automatically attaches teat cups of a milking machine to the teats of milking animals. To this end some kind of teat position sensing arrangement has to be applied, by aid of which the robot arm can find the teats of the milking animals. Various two-dimensional or three-dimensional camera arrangements have been proposed as such teat position sensing arrangement.

WO 2010/023122 discloses an arrangement for determining positions of the teats of a milking animal in a milking system comprising a milking stall for housing the milking animal during milking, a movable robot arm for automatically attaching teat cups to the teats of the milking animal in the milking stall, and a control device for controlling the movement of the robot arm based on determined positions of the teats of the milking animal. The arrangement comprises a camera directed towards the udder of the milking animal in the milking stall and provided to repeatedly record images of the udder of the milking animal, and processing means provided for repeatedly forming three-dimensional images from the images recorded by the camera; and for detecting the teats of the milking animal and determining their positions in all three spatial dimensions based on the repeatedly formed three-dimensional images.

SUMMARY OF THE INVENTION

The present inventors have come to the insight that in an automatic milking system comprising a camera directed towards the udder of the milking animal in the milking stall and provided to repeatedly record images of the udder of the milking animal, there are very little additional adjustments to be made in order to automatically determine a breeding rating.

Estimations of breeding values for dairy breeds in Sweden are based on NAV (Nordic Cattle Genetic Evaluation). A large number of traits are combined into a breeding index; cows with high index being greater economic benefits to the farmer, and the use of dairy bull sires with high index will give offspring higher economic value. Traits that may go into the index comprises: milk yield and quality, growth, fertility (calving interval), calving (complexity, risk for stillborn calves), udder health (mastitis), other diseases, body, udder (udder shape, teat shape), feet and legs, longevity, milking speed, and temperament. The traits are weighted together on the basis of economic values quantifying the value of a marginal change in the trait. For dairy bull sires, the index also reflects traits of their daughters. Traits such as body, udder (udder shape, teat shape), and feet and legs are typically determined by manual inspection by an experienced herdsman or breeding expert. This is labor intensive and costly and is thus normally only performed at rare occasions. Further, since the trait determination is made by manual inspection, it dependent upon the person making the determination and is thus based on a subjective judgment.

In one aspect a combined teat position and breeding rating determining arrangement is provided for a milking system comprising a milking stall for housing the milking animal during milking, a movable robot arm for automatically attaching teat cups to the teats of the milking animal in the milking stall, and a control device for controlling the movement of the robot arm based on determined positions of the teats of the milking animal. The arrangement comprises a three-dimensional camera, such as e.g. a time-of-flight camera, directed towards the udder of the milking animal in the milking stall and provided to repeatedly record three-dimensional images of the udder of the milking animal prior to milking; and processing means provided to repeatedly detect the teats of the milking animal and determine their positions based on the repeatedly recorded three-dimensional images. Further, the processing means is arranged to automatically determine the shapes of the teats of the milking animal based on the repeatedly recorded three-dimensional images and to calculate a breeding rating based on the determined shapes of the teats of the milking animal.

Preferably, the processing means is arranged to repeatedly detect the udder including the teats of the milking animal and determine its position based on the repeatedly recorded three-dimensional images, and is arranged to automatically determine the shape of the udder of the milking animal based on the repeatedly recorded three-dimensional images and to calculate a breeding rating based on the determined shape of the udder of the milking animal.

The breeding rating is the breeding rating for that milking animal or for the dairy bull sire which is the father of the milking animal. However, the breeding rating for such a dairy bull sire should of course reflect also other daughters of him.

The processing means may be arranged to automatically determine one or more of the lengths of the teats of the milking animal; the circumferences or thicknesses of the teats of the milking animal; conicities of the teats of the milking animal; the distances between the teats of the milking animal; the orientations of the teats of the milking animal; the orientations of the front teats as compared to the rear teats of the milking animal; the distance between the udder and the floor, on which the milking animal stands; the distance between the udder and the floor for a front portion of the udder as compared to a rear portion of the udder of the milking animal; and the distance between the udder and the floor for a left portion of the udder as compared to a right portion of the udder of the milking animal based on the repeatedly recorded three-dimensional images and to calculate the breeding rating based on the determined parameter(s).

The automated teat position and breeding rating determining arrangement is capable of automatically calculating a breeding rating based on the determined shapes of the teats of the milking animal and optionally on the above determined parameter(s). The breeding rating is determined without labor intensive and costly manual inspection. Further, the breeding rating can be calculated at higher repetition frequency. The three-dimensional camera, which is used for imaging the teats to thereby enable control of the robot arm during teat cup attachment, is also used for the determination of the breeding rating. Thus, the breeding rating can be determined automatically to virtually no additional cost.

The determination of the teat shapes and/or the above parameter(s) and the calculation of the breeding rating may be performed each time the milking animal is milked or somewhat more rarely, such as once a day, once a week, once a month or once a year.

The processing means can be arranged to automatically compare the determined shapes and/or the above parameter (s) or the calculated breeding ratings at two different milkings (e.g. consecutive determinations/calculation) and to automatically initiate an alarm if the determined shapes and/or the above parameter(s) differ from one another to more than a threshold extent or the calculated breeding ratings differ from one another to more than a threshold value.

In such instance, the processing means can be arranged, concurrently with the initiation of the alarm, to send instructions to the milking system to not milk the milking animal and/or to take actions in order to give the milking animal treatment.

In one embodiment, the three-dimensional camera is directed towards the udder of the milking animal in the milking stall immediately after the milking of the milking animal and is provided to record at least one three-dimensional image of the udder of the milking animal, and the processing means is arranged to automatically determine the post-milking shapes of the teats of the milking animal based on the at least one three-dimensional image recorded immediately after the milking and to calculate a breeding rating based also on the post-milking shapes of the teats of the milking animal. It is quite obvious that the shapes of the teats of the milking animal are different immediately prior to a milking as compared to immediately after the milking. By these provisions, the breeding rating is calculated based on both the pre-milking teat shapes and the post-milking teat shapes.

In another embodiment, the processing means may be arranged to automatically receive or collect from the milking system one or more of: the milk yield of the milking animal; the milking frequency of the milking animal; the quality of the milk from the milking animal; the udder filling level of the milking animal, the lactation phase of the milking animal; the health of the milking animal; the udder health of the milking animal, the weight of the milking animal; the age of the milking animal; the condition of the feet and legs of the milking animal; the fertility of the milking animal; and the stillbirth frequency of the milking animal, wherein the processing means may be arranged to automatically calculate the breeding rating also based on this received or collected information.

In yet another embodiment, the three-dimensional camera is movable, is directable towards another area of the milking animal in the milking stall, and is provided to record one or more three-dimensional images of this other area of the milking animal, wherein the processing means may be arranged to automatically determine at least one physical property of the milking animal based on the recorded one or more three-dimensional images of the other area of the milking animal and to automatically calculate the breeding rating also based on the at least one physical property.

The other area of the milking area may be an area including one or more feet and/or one or more legs of the milking animal; and the at least one physical property of the milking animal may be a physical property of the one or more feet and/or the one or more legs.

In another aspect, a combined teat position and breeding rating determining method is provided for a milking system comprising a milking stall for housing the milking animal during milking, a movable robot arm for automatically attaching teat cups to the teats of the milking animal in the milking stall, and a control device for controlling the movement of the robot arm based on determined positions of the teats of the milking animal. A three-dimensional camera is directed towards the teats of the milking animal in the milking stall. Three-dimensional images of the teats of the milking animal are repeatedly recorded by the three-dimensional camera. The teats of the milking animal are detected and their positions are determined repeatedly and automatically based on the repeatedly recorded three-dimensional images. The shapes of the teats of the milking animal are automatically determined based on at least one of the same repeatedly recorded three-dimensional images as used for the teat position determination. Finally, a breeding rating is automatically calculated based on the determined shapes of the teats of the milking animal.

Further characteristics and advantages will be evident from the following detailed description of embodiments given hereinafter and the accompanying FIGS. 1-4, which are given by way of illustration only, and are thus not limitative.

BRIEF DESCRIPTION OF THE DRAWINGS

FIGS. 1 and 3 are top views while FIG. 2 is a perspective view.

Identical reference numerals are used throughout the Figures to denote identical or similar components, portions, details and the like of the various embodiments.

DETAILED DESCRIPTION OF EMBODIMENTS

Figure 1:
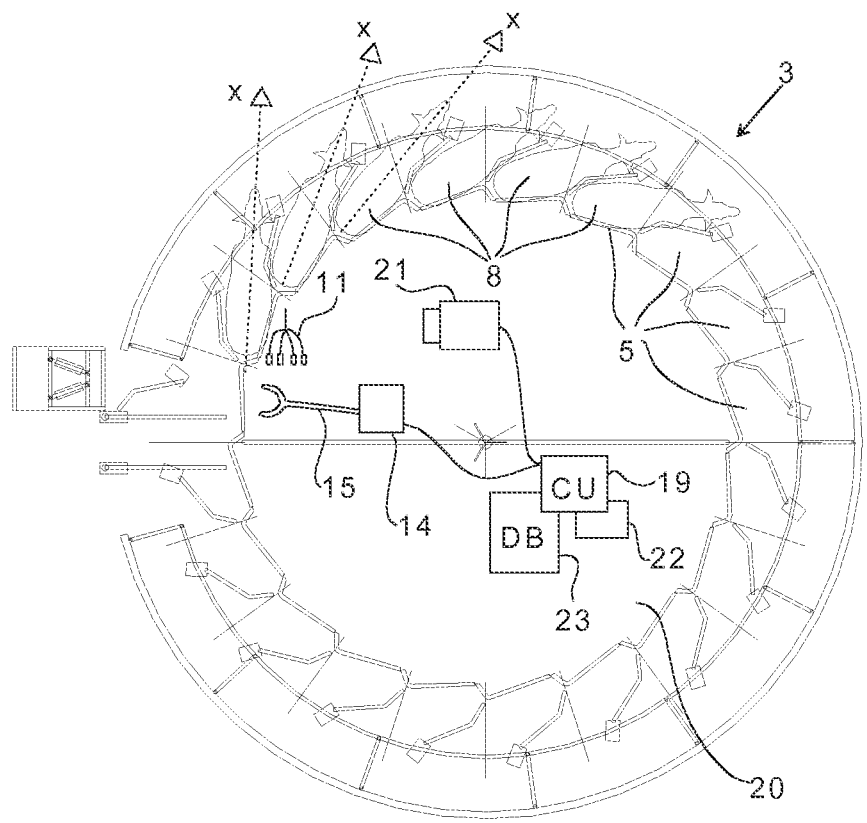
FIGS. 1-3 display each a schematically outlined milking system including a combined teat position and breeding rating determining arrangement according to a respective embodiment.

In FIG. 1 is shown a rotary milking system 3, in which a combined teat position and breeding rating determining arrangement according to an embodiment is implemented. The rotary milking system 3 comprises a plurality of milking stalls 5, which milking animals 8 enter in a sequential order. Each of the milking stalls 5 comprises milking equipment including teat cups that are attached to the teats of the milking animal present in the milking stall prior to milking. For sake of simplicity teat cups 11 are illustrated only for one of the milking stalls 5. The rotary milking system 3 may be of parallel, tandem, or herringbone configuration. In the parallel configuration the longitudinal directions of the milking stalls and of the milking animals therein extend radially (the milking animals stand side by side), in the tandem configuration the longitudinal directions of the milking stalls and of the milking animals therein extend circumferentially (the milking animals stand one after the other), and in the herringbone configuration, which is illustrated in FIG. 1, the longitudinal directions x of the milking stalls and of the milking animals therein extends partly radially, partly circumferentially.

A robot 14 provided with a robot arm 15 is provided for automatically attaching teat cups 11 to the teats of the milking animals 8 present in the milking stalls 5 under the control of a control device 19, which is operatively connected to the milking robot 14. The milking robot 14 is preferably stationary with respect to a rotatable carousel or rotating platform 20 of the rotary milking system 3, which forms the support for the milking stalls 5. Alternatively, the milking robot 14 is movable back and forth in e.g. a circumferential direction.

The rotating platform 20 may, for each of the milking animals, be kept still while the milking robot 14 automatically attaches teat cups 11 to the teats of the milking animal 8, and be rotated there in between. Alternatively, the rotating platform 20 is rotated continuously during the attachment of the teat cups 11 and the milking of the milking animals 8.

A combined teat position and breeding rating determining arrangement comprising a three-dimensional camera 21 and processing means 22 is provided partly to determine positions of the teats of the milking animals 8 present in the milking stalls 5, thereby enabling the robot 14 to move the teat cups 11 to the teats of the milking animals 8 present in the milking stalls 5, partly to determine a breeding rating.

The three-dimensional camera 21 may be a time-of-flight camera. A commercially available time-of-flight camera that can be used in the present invention is the SwissRanger SR3000 from Mesa Imaging AG, Switzerland. The SR3000 is a general purpose range three-dimensional real time imaging camera. The three-dimensional camera 21 can easily be connected to a computer via USB 2.0, enabling straightforward measurement of real-time depth maps. Designed for operation under lighting conditions, the compact camera may be offered with a complete visualization software program.

The three-dimensional camera and the technique behind the three-dimensional camera are further disclosed in the publications "An all-solid-state optical range camera for 3D real-time imaging with sub-centimeter depth resolution (SwissRanger™)" and "3D-Imaging in Real-Time with Miniaturized Optical Range Camera" by T. Oggier et al. available at the Mesa Imaging AG Internet site http://www.mesa-imaging.ch/ on Dec. 27, 2007. The contents of the above publications are hereby incorporated by reference. The three-dimensional camera 21 is, for each of the milking animals in the milking stalls, directed towards the udder of the milking animal to repeatedly record three-dimensional images of the udder of the milking animal in real time. The processing means 22 is provided, for each of the milking animals, for repeatedly detecting the teats of the milking animal and determining their positions in all three spatial dimensions by a calculation method based on the repeatedly recorded three-dimensional images of the udder of the milking animal.

The combined teat position and breeding rating determining arrangement thus determines directly the position in all three spatial coordinates for each object point that is found in the pixels of the image recorded. Thus, the coordinates are in principle determined in real time.

Further, the processing means 22 is arranged, for each of the milking animals, to automatically determine the shapes of the teats of the milking animal by a calculation method based on the repeatedly recorded three-dimensional images and to calculate a breeding rating based on the determined shapes of the teats of the milking animal.

The processing means 22 is preferably implemented as a software module in the control device 19, which thus is operatively connected to the three-dimensional camera 21, or in any other device operatively connected to the three-dimensional camera 21 and the control device 19. The processing means 22 may alternatively be integrated in the three-dimensional camera 21.

The processing means 22 may automatically determine one or more of: the lengths of the teats of the milking animal 8; the circumferences or thicknesses of the teats of the milking animal 8; conicities of the teats of the milking animal 8; the distances between the teats of the milking animal 8; the orientations of the teats of the milking animal 8; the orientations of the front teats as compared to the rear teats of the milking animal 8; the distance between the udder and the floor, on which the milking animal 8 stands; the distance between the udder and the floor for a front portion of the udder as compared to a rear portion of the udder of the milking animal 8; and the distance between the udder and the floor for a left portion of the udder as compared to a right portion of the udder of the milking animal 8 based on the repeatedly recorded three-dimensional images.

Thereafter, the processing means 22 may calculate the breeding rating based on one or more of: the lengths of the teats of the milking animal 8; the circumferences or thicknesses of the teats of the milking animal 8; the conicities of the teats of the milking animal 8; the distances between the teats of the milking animal 8; the orientations of the teats of the milking animal 8; the orientations of the front teats as compared to the rear teats of the milking animal 8; the distance between the udder and the floor, on which the milking animal 8 stands; the distance between the udder and the floor for the front portion of the udder as compared to the rear portion of the udder of the milking animal 8; and the distance between the udder and the floor for the left portion of the udder as compared to the right portion of the udder of the milking animal 8.

Calculation of the breeding rating based on manual inspection of the above parameters is well known and thus not detailed herein. It may be done in a plurality of manners as disclosed in the field and/or known to a skilled person. Reference is made for example to http://www.vikinggenetics.com/sv/avel/, especially the article "Genetic evaluation within NAV".

The breeding rating may be calculated repeatedly to follow the rating development over time for a particular milking animal 8. Thus, the three-dimensional camera 21 may be directed towards the udder of the milking animal 8 in the milking stall and provided to repeatedly record three-dimensional images of the udder of the milking animal at a plurality of milkings of the milking animal 8, wherein the processing means 22 may, for each of the plurality of milkings, be arranged to automatically determine the shapes of the teats of the milking animal 8 based on the repeatedly recorded three-dimensional images and to calculate a breeding rating based on the determined shapes of the teats of the milking animal.

The plurality of milkings may or may not be consecutively performed milkings of the milking animal. In the latter case, the milkings may be performed once a day, once a week, once a month, once a year, more rarely, or more frequently.

In one embodiment, the processing means 22 is, for two following ones of the plurality of milkings, arranged to automatically compare the determined shapes of the teats of the milking animal 8 or the calculated breeding ratings; and to automatically initiate an alarm if, for the two following ones of the plurality of milkings, the determined shapes of the teats of the milking animal differ from one another to more than a threshold extent or the calculated breeding ratings differ from one another to more than a threshold value. This may indicate that the milking animal has suffered from a snake bite or that the udder/teats have been injured such as e.g. stepped on.

Concurrently with the initiation of the alarm, the processing means 22 may be arranged to send instructions to the milking system 3 not to milk the milking animal 8.

Alternatively, or additionally, the processing means 22 may be arranged, concurrently with the initiation of the alarm, to send instructions to the milking system 3 to take actions in order to give the milking animal 8 treatment.

Further, the processing means 22 may take further parameters into consideration when calculating the breeding rating for a milking animal 8. For instance, the processing means 22 may be arranged to automatically receive or collect from the milking system 3 one or more of: the milk yield of the milking animal 8; the milking frequency of the milking animal 8; the quality of the milk from the milking animal 8; the udder filling level of the milking animal 8; the lactation phase of the milking animal 8; the health of the milking animal 8; the udder health of the milking animal 8; the weight of the milking animal 8; the age of the milking animal 8; the condition of feet and legs of the milking animal 8; the fertility of the milking animal 8; and the stillbirth frequency of the milking animal 8.

Thereafter, the processing means 22 may automatically calculate the breeding rating also based on one or more of: the milk yield of the milking animal 8; the milking frequency of the milking animal 8; the quality of the milk from the milking animal 8; the udder filling level of the milking animal 8; the lactation phase of the milking animal 8; the health of the milking animal 8; the udder health of the milking animal 8; the weight of the milking animal 8; the age of the milking animal 8; the condition of feet and legs of the milking animal 8; the fertility of the milking animal 8; and the stillbirth frequency of the milking animal 8.

The determination of the shapes of the teats of the milking animal can be made in the following manner. First the milking animal is detected and the position thereof is determined. Based on this information the contour of the back legs and the body therein between is detected and the positions thereof are determined. Based on this information an area of interest (i.e. where the teats most probably are found) is located, and in this area the udder of the milking animal is searched for. When the udder has been detected and located the teats are searched for and located. Finally, when the shapes of the teats are determined, the breeding rating is calculated in dependence thereon.

The three-dimensional camera 21 can be mounted in a fixed position with respect to the different parts of the milking system 3 depending on the application in question. The three-dimensional camera 21 can be located at a fix position with respect to a floor, on which the rotary milking system 3 is installed and with respect to which the rotary platform 20 of the rotary milking system 3 rotates during milking. In such instance, the three-dimensional camera 21 can be mounted on the floor or in the ceiling of the building in which the milking system is installed.

Alternatively, the three-dimensional camera 21 can be mounted on the rotating platform 20 or on the robot arm 15.

Still alternatively, the three-dimensional camera 21 can be movable along some path. In one version, for instance, the three-dimensional camera 21 can be movable between a first position or area, in which the three-dimensional camera 21 is located during the recordings of the three-dimensional images, and a second position, in which the three-dimensional camera 21 is located there in between, that is, when being idle.

In one embodiment, the three-dimensional camera 21 is movable, is directable towards another area of the milking animal 8 in the milking stall 5, and is provided to record one or more three-dimensional images of the another area of the milking animal 8, wherein the processing means 22 determines automatically at least one physical property of the milking animal 8 based on the recorded one or more three-dimensional images of the another area of the milking animal 8 and calculate the breeding rating also based on the at least one determined physical property. The another area of the milking animal 8 may be an area including one or more feet and/or one or more legs, whereas the at least one physical property of the milking animal 8 may be a physical property of the one or more feet and/or the one or more legs, such as the straightness of the hind legs.

The three-dimensional camera 21 can further be located, for each of the milking animals, in various positions and orientations during the recordings of the three-dimensional images of the teats of the milking animal 8. For instance, it may be located behind the udder of the milking animal 8, at the side of the udder of the milking animal 8, or below the udder of the milking animal 8.

Still further, two or more three-dimensional cameras can be connected to the processing means 22 in order to provide further detailed three-dimensional information of the positions and orientations of the teats of the milking animal 8.

For instance, several of the three-dimensional cameras seem to be usable if they are not mounted fixedly on the robot arm since at least one teat would possibly be obscured at each instant. Further, one or several three-dimensional cameras arranged stationary on the floor or on the rotating platform 20 could be combined with one three-dimensional camera mounted on the robot arm 15.

It shall further be appreciated that the combined teat position and breeding rating determining arrangement may be used as a multifunctional detection arrangement for detecting any of the following: (i) presence of a milking animal 8 in a milking stall 5, (ii) the behavior of a milking animal 8, (iii) the activity of a milking animal 8, (iv) the body shape of a milking animal 8, (v) an incorrect teat cup attachment, (vi) a teat cup kick-off, (vii) presence of an obstacle in the working area of the milking robot 14, (viii) a parameter related to the operation of the milking robot 14, and (ix) a parameter related to the operation of the three-dimensional camera 21.

Figure 2:
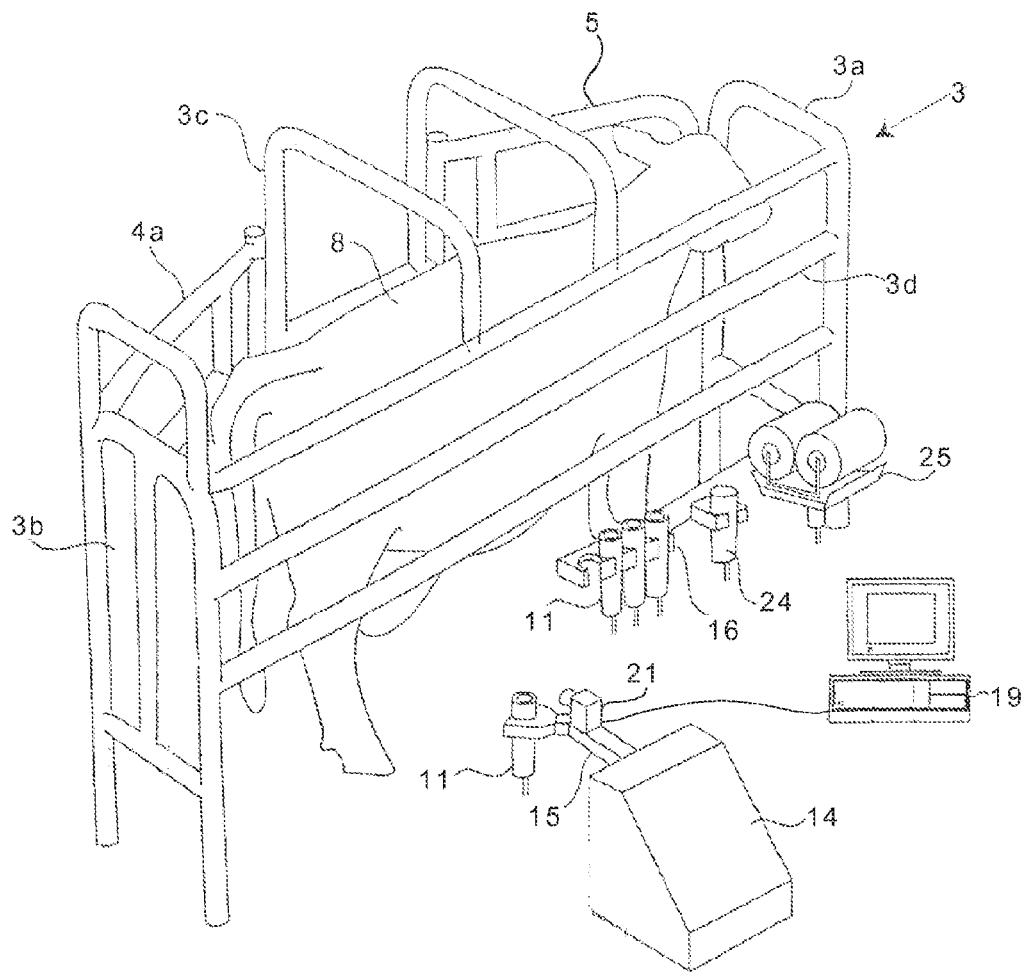

With reference next to FIG. 2, the combined teat position and breeding rating determining arrangement is implemented in a voluntary milking system or station 3 comprising an enclosure having an inlet gate 4 and an outlet gate 5, which are both capable of being opened automatically. The front end of the milking station 3 is denoted by 3a, the back end is denoted by 3b, the sides are denoted by 3c and 3d.

The milking station 3 comprises further an automatic milking machine (not explicitly illustrated) including teat cups 11 connected to an end unit by means of milk lines (only the portions attached to the teat cups 11 are shown in FIG. 2). The milking station further includes a milking robot 14 having a movable robot arm 15 provided with a gripper. The milking robot 14 is arranged to automatically apply the teat cups 11 of the milking machine to the teats of a milking animal 8 present in the milking station 3 prior to milking. In FIG. 2 three of the teat cups 11 are arranged in a teat cup rack or magazine 16, whereas the fourth one is held by the gripper of the robot arm 15. Typically, a teat cleaning device including e.g. a teat cleaning cup 24 or brushes 25 may be provided for cleaning the teats of the milking animal 8 prior to milking.

Further, the milking station 3 comprises an identification device (not illustrated) provided to identify a milking animal approaching the milking station 3, and a control device 19, which is responsible for controlling of the milking system, which inter alia includes the initiation of various activities in connection with the milking such as e.g. opening and closing of the gates 4 and 5, and control of the milking machine and its handling device 14

The combined teat position and breeding rating determining arrangement comprises a three-dimensional camera 21 arranged to repeatedly record three-dimensional images of the udder of the milking animal in real time and processing means e.g. implemented in the control device 19. The three-dimensional camera 21 is mounted on the movable robot arm 15 of the milking robot 14.

The processing mean is arranged to repeatedly detect the teats of the milking animal 8 and determine their positions based on the repeatedly recorded three-dimensional images and to automatically determine the shapes of the teats of the milking animal 8 based on the repeatedly recorded three-dimensional images and to calculate a breeding rating based on the determined shapes of the teats of the milking animal 8.

In other respects, the embodiment of FIG. 2 may comprise any of the features or functionalities as disclosed with reference to the embodiment of FIG. 1.

Figure 3:
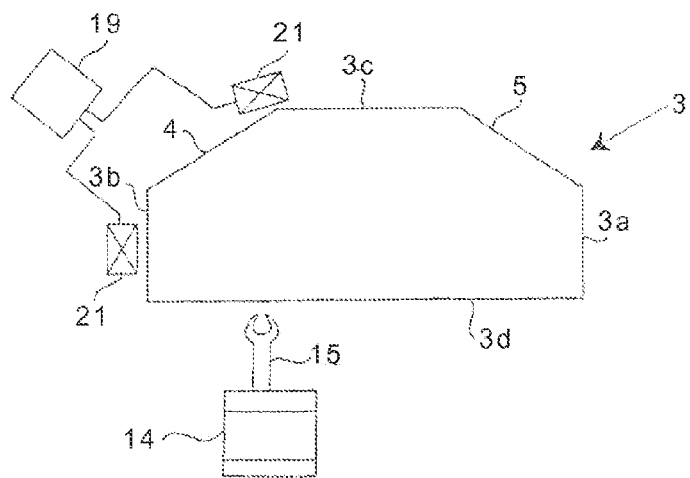

FIG. 3 illustrates a further embodiment wherein the combined teat position and breeding rating determining arrangement is implemented in a voluntary milking system of the above kind. Here, two three-dimensional cameras 21 are mounted in fixed positions with respect to the milking station 3. One three-dimensional camera 21 is arranged to record three-dimensional images of the udder of a milking animal from behind and one three-dimensional camera 21 is arranged to record three-dimensional images of the udder of the milking animal from a side.

The processing means, e.g. implemented in the control device 19, to which the three-dimensional cameras 21 are operatively connected, is provided for determining the positions of the teats of the milking animal in all three spatial dimensions relative the milking station 3 based on three-dimensional images recorded by the two three-dimensional cameras. Further, the processing means is arranged to automatically determine the shapes of the teats of the milking animal based on the repeatedly recorded three-dimensional images and to calculate a breeding rating based on the determined shapes of the teats of the milking animal.

It shall be appreciated that the combined teat position and breeding rating determining arrangements disclosed above may be implemented in virtually any kind of milking system where the teat positions need to be found automatically.

Figure 4:
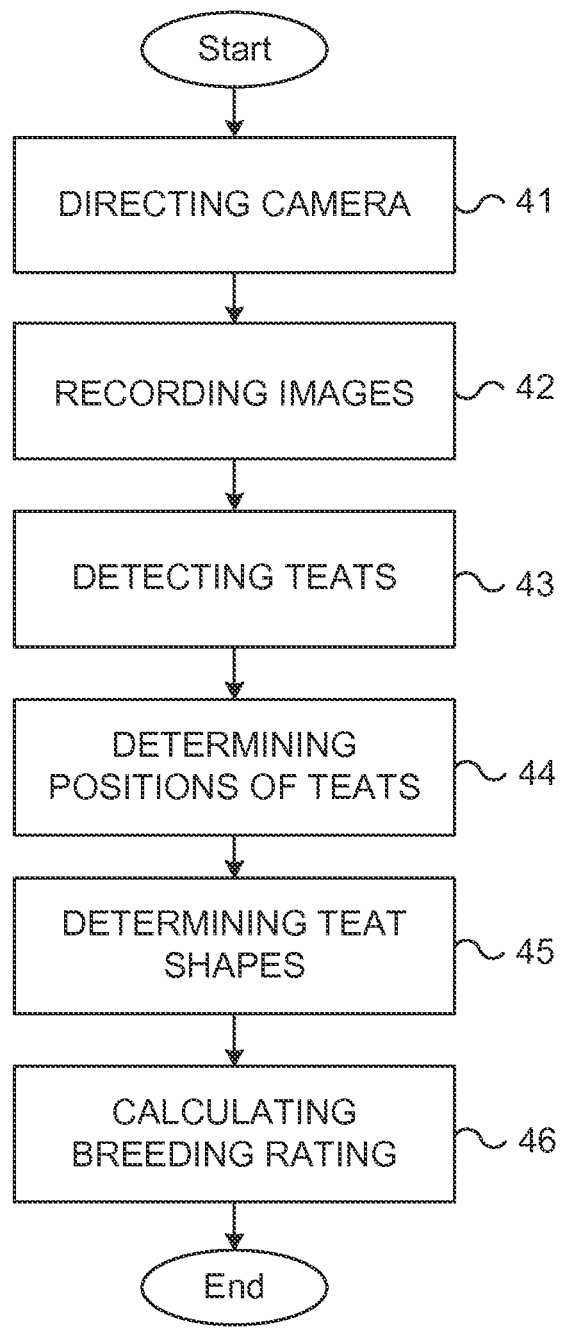
FIG. 4 displays schematically, in a flow diagram, a combined teat position and breeding rating determining method according to an embodiment.

FIG. 4 displays schematically, in a flow diagram, a combined teat position and breeding rating determining method according to an embodiment. The method is implemented in a milking system comprising a milking stall for housing a milking animal during milking, a movable robot arm for automatically attaching teat cups to the teats of the milking animal in the milking stall, and a control device for controlling the movement of the robot arm based on determined positions of the teats of the milking animal.

A three-dimensional camera 21, such as e.g. a time-of-flight camera, is, in a step 41, directed towards the teats of the milking animal in the milking stall, and three-dimensional images of the teats of the milking animal is, in a step 42, repeatedly recorded by the three-dimensional camera 21. The teats of the milking animal are, in steps 43 and 44, repeatedly and automatically detected and their positions determined based on the repeatedly recorded three-dimensional images. Preferably, the steps 43 and 44 are performed by digital image processing software. These steps are performed in order to enable the control device to control the robot arm to attach the teat cups to the teats of the milking animal.

Next, the shapes of the teats of the milking animal are, in a step 45, automatically determined based on the repeatedly recorded three-dimensional images. Finally, a breeding rating is, in a step 46, automatically calculated based on the determined shapes of the teats of the milking animal. Preferably, the steps 45 and 46 are performed by digital image processing software.

It shall be appreciated that the breeding rating may be calculated also based on a number of other parameters, e.g. as being disclosed above. Each of the features disclosed above may be independently incorporated into the teat position and breeding rating determining method displayed in FIG. 4.

The invention claimed is:

1. A combined teat position and breeding rating determining method, said method comprising:
   in a milking system (3) comprising a milking stall (5) that houses a milking animal (8) during milking of the milking animal, a movable robot arm (15) that automatically attaches teat cups (11) to teats of the milking animal in the milking stall, and a control device (19) that controls movement of said robot arm based on determined positions of the teats of the milking animal, the control device (19) including a processing part (21), performing:
   a recording step of automatically and repeatedly recording (42) three-dimensional images of the milking animal in real time by a three-dimensional camera (21) directed (41) towards an udder of the milking animal in the milking stall;
   a position determination step of the processing part repeatedly and automatically detecting and determining one of the group consisting of i) the udder of the milking animal and the udder's position, and ii) the teats of the milking animal and teat (4) positions, based on said repeatedly recorded three-dimensional images;
   a shape determining step of the processing part (21) automatically determining (45) one of the group consisting of i) the shape of the udder, and ii) the shapes of the teats, based on at least one of said repeatedly recorded three-dimensional images; and
   a breeding rating step of the processing part (21) automatically calculating (46) a breeding rating based on one of the group consisting of i) the determined shape of the udder, and ii) the determined shapes of the teats.

2. The method of claim 1, wherein,
   in said position determination step, the processing part repeatedly and automatically detects the udder of the milking animal and determines the udder's position,
   in the shape determining step, the processing part (21) automatically determines the shape of the udder, and
   in the breeding rating step, the processing part (21) automatically calculates (46) the breeding rating based on the determined shape of the udder.

3. The method of claim 1, comprising the further step of:
   based on said repeatedly recorded three-dimensional images from said recording step, automatically determining at least one of the group consisting of:
   lengths of the teats of the milking animal,
   circumferences of the teats of the milking animal,
   thicknesses of the teats of the milking animal,
   conicities of the teats of the milking animal,
   distances between the teats of the milking animal, orientations of the teats of the milking animal, a comparison of orientations of front teats to orientations of rear teats of the milking animal,
a distance between the udder and a floor on which the milking animal stands,
a comparison of a distance between the udder and the floor for a front portion of the udder to a distance between the udder and the floor for a rear portion of the udder of the milking animal, and
a comparison of a distance between the udder and the floor for a left portion of the udder to a distance between the udder and the floor for a right portion of the udder of the milking animal,
wherein, in said breeding rating step, in addition to the determined shapes of the teats of the milking animal, said breeding rating is automatically calculated based on at least one of the group consisting of:
the lengths of the teats of the milking animal,
the circumferences of the teats of the milking animal,
the thicknesses of the teats of the milking animal,
the conicities of the teats of the milking animal,
the distances between the teats of the milking animal,
orientations of the teats of the milking animal,
the comparison of orientations of front teats to orientations of rear teats of the milking animal,
the distance between an udder and a floor on which the milking animal stands,
the comparison of a distance between the udder and the floor for a front portion of the udder to a distance between the udder and the floor for a rear portion of the udder of the milking animal, and
the comparison of a distance between the udder and the floor for a left portion of the udder to a distance between the udder and the floor for a right portion of the udder of the milking animal.

4. The method of claim 1, wherein said recording step is performed with the animal in the milking stall and prior to the milking of the milking animal, and
comprising the further steps of:
directing the three-dimensional camera towards the udder of the milking animal in the milking stall;
with the three-dimensional camera directed towards the udder of the milking animal in the milking stall and subsequent to the milking of the milking animal, an udder recording step of recording at least one three-dimensional udder image of the udder of the milking animal; and
a further shape determining step of determining the shapes of the teats of the milking animal based on the at least one three-dimensional udder image recorded in said udder recording step,
wherein said calculation of the breeding rating in said breeding rating step is also based on the shapes of the teats of the milking animal as determined from said further shape determining step from the at least one three-dimensional udder image recorded in said udder recording step.

5. The method of claim 1, wherein,
during said recording step, the three-dimensional camera (21) is directed towards the udder of the milking animal in the milking stall and three-dimensional images of the udder of the milking animal are repeatedly recorded at a plurality of consecutively performed milkings of said milking animal,
for each of said plurality of consecutively performed milkings, the shapes of the teats of the milking animal are automatically determined based on said repeatedly recorded three-dimensional images of the udder, and
in said breeding rating step, the breeding rating is calculated from the determined shapes of the teats of the milking animal from the repeatedly recorded plurality of consecutively performed milkings of said milking animal.

6. The method of claim 1, wherein,
during said recording step, the three-dimensional camera (21) is directed towards the udder of the milking animal in the milking stall and three-dimensional images of the udder of the milking animal are repeatedly recorded at a plurality of non-consecutively performed milkings of said milking animal, said recording at the non-consecutively performed plurality of milkings being performed at a frequency of one of the group consisting of once a day, once a week, once a month, and once a year,
for each of said plurality of non-consecutively performed milkings, the shapes of the teats of the milking animal are automatically determined based on said repeatedly recorded three-dimensional images of the udder, and
in said breeding rating step, the breeding rating is calculated from the determined shapes of the teats of the milking animal from the repeatedly recorded plurality of non-consecutively performed milkings of said milking animal.

7. The method of claim 1, comprising the further steps of:
automatically comparing i) the determined shapes of the teats of the milking animal from a first milking with ii) the determined shapes of the teats of the milking animal from a following second milking; and
automatically initiating an alarm when the comparing step determines that the determined shapes of the teats of the milking animal in the first and second milkings differ from one another to more than a threshold extent.

8. The method of claim 7, wherein, concurrently with the initiation of said alarm, instructions are automatically sent to the milking system to not milk the milking animal.

9. The method of claim 7, wherein, concurrently with the initiation of said alarm, instructions are automatically sent to the milking system to take actions in order to give the milking animal treatment.

10. The method of claim 1, comprising the further steps of:
automatically determining at least one of the group consisting of:
milk yield of the milking animal,
milking frequency of the milking animal,
a quality of milk from the milking animal,
udder filling level of the milking animal,
a lactation phase of the milking animal,
a health of the milking animal,
an udder health of the milking animal,
a weight of the milking animal,
an age of the milking animal,
a condition of feet and legs of the milking animal,
fertility of the milking animal, and
a stillbirth frequency of the milking animal; and
in said breeding rating step, in addition to the determined shapes of the teats of the milking animal, said breeding rating is automatically calculated based at least one of the group consisting of:
the milk yield of the milking animal,
the milking frequency of the milking animal,
the quality of milk from the milking animal,
the udder filling level of the milking animal,
the lactation phase of the milking animal,
the health of the milking animal,
the udder health of the milking animal, the weight of the milking animal,
the age of the milking animal,
the condition of feet and legs of the milking animal,
the fertility of the milking animal, and
the stillbirth frequency of the milking animal.

11. The method of claim 1, wherein in said recording step, the three-dimensional camera is mounted on the robot arm.

12. The method of claim 1, wherein in said recording step, the three-dimensional camera is located at a fix position with respect to the robot arm.

13. The method of claim 1, wherein,
the milking system is a rotary milking system, and
in said recording step, the three-dimensional camera is located at a fix position with respect to a floor on which said rotary milking system is installed and with respect to which a rotary platform of said milking system rotates during the milking of the milking animal.

14. The method of claim 1, wherein in said recording step, the three-dimensional camera is located behind the milking animal and is directed forward towards a back of the milking animal.

15. The method of claim 1, wherein in said recording step, the three-dimensional camera is located at a side of the milking animal and is directed toward the side of the milking animal.

16. The method of claim 1, wherein,
the recording step of repeatedly recording (42) three-dimensional images of the teats of the milking animal is performed on pre-milking teats prior to the milking of the animal, and the shape determining step automatically determines (45) shapes of the pre-milking teats of the milking animal based on at least one of said repeatedly recorded three-dimensional images of the pre-milking teats, and
the method further comprises the steps of:
a further recording step of the processing part (21) repeatedly recording (42) three-dimensional images of post-milking teats of the milking animal in real time by the three-dimensional camera (21) directed (41) towards the teats of the milking animal in the milking stall after the milking of the animal in the stall; and
a further shape determining step of the processing part (21) automatically determining (45) shapes of the post-milking teats of the milking animal based on at least one of said repeatedly recorded three-dimensional images of the post-milking teats,
wherein said breeding rating step of automatically calculating (46) the breeding rating based on the determined shapes of the teats of the milking animal includes using both the determined pre-milking teat shapes and the determined post-milking teat shapes.

17. The method of claim 1, comprising the further steps of:
automatically comparing i) the calculated breeding rating of the milking animal from a first milking with ii) the calculated breeding rating of the milking animal from a following second milking; and
automatically initiating an alarm when the comparing step determines that the calculated breeding ratings from the first and second milkings differ from one another to more than a threshold value.

18. The method of claim 1, wherein in said shape determining step, said determination of the shapes of the teats of the milking animal is based on at least one of said repeatedly recorded three-dimensional images as used for said position determination step.

19. A combined teat position and breeding rating determining arrangement for a milking system (3) comprising:
a milking stall (5) that houses a milking animal (8) during milking;
a movable robot arm (15) that automatically attaches teat cups (11) to teats of the milking animal in the milking stall;
a control device (19) that controls movement of said robot arm based on determined positions of the teats of the milking animal, the control device including a processing part (21);
a three-dimensional camera (21) directable towards an udder of the milking animal in the milking stall and that repeatedly records three-dimensional images of the udder of the milking animal prior to milking; and
a processing device (22) that repeatedly detects the udder or teats of the milking animal and determines positions of the udder or teats based on said repeatedly recorded three-dimensional images, wherein,
the three-dimensional camera (21) automatically repeatedly records (42) three-dimensional images of the udder or teats of the milking animal in real time while being directed (41) towards the udder or teats of the milking animal in the milking stall,
the processing part (22) repeatedly and automatically detects (43) the udder or teats of the milking animal and determines (44) positions of the detected udder or teats based on said repeatedly recorded three-dimensional images,
the processing part (22) automatically determines (45) shapes of the udder or teats of the milking animal based on at least one of said repeatedly recorded three-dimensional images, and
the processing part (22) automatically calculates a breeding rating based on the determined shapes of the udder or teats of the milking animal.

* * * * *